March 7, 1950 L. M. POTTS 2,499,776

AUDIBLE TELEPHONIC LINE IDENTIFICATION

Filed May 27, 1946 2 Sheets-Sheet 1

INVENTOR
LOUIS M. POTTS, DECEASED
MARTHA W. C. POTTS, EXECUTRIX
BY Emery Robinson
ATTORNEY March 7, 1950 L. M. POTTS 2,499,776

AUDIBLE TELEPHONIC LINE IDENTIFICATION

Filed May 27, 1946 2 Sheets-Sheet 2

INVENTOR
LOUIS M. POTTS, DECEASED
MARTHA W. C. POTTS, EXECUTRIX
BY Emery Robinson
ATTORNEY Patented Mar. 7, 1950 2,499,776

UNITED STATES PATENT OFFICE 2,499,776

AUDIBLE TELEPHONIC LINE IDENTIFICATION

Louis M. Potts, deceased, late of Evanston, Ill., by Martha W. C. Potts, executrix, Evanston, Ill., assignor to Teletype Corporation, Chicago, Ill., a corporation of Delaware Application May 27, 1946, Serial No. 672,467

4 Claims. (Cl. 179—27)

The present invention relates to telephone systems, and more particularly to line identifiers for use therewith.

In present day telephone systems it is necessary in the making of toll or long distance calls to summon an operator in order to complete a call through to the called subscriber. It is then the operator's duty not only to complete the connection for the call, but to make out a toll ticket bearing sufficient information so that the correct charge may be arrived at and the calling subscriber billed accordingly. In order to have sufficient information the operator must, obviously, know the number of the calling subscriber, which is generally obtained by requesting the calling subscriber to repeat it to the operator. There is, of course, always a chance that a subscriber may give the operator an incorrect number, resulting in improper and incorrect billing to a subscriber.

Likewise, where automatic toll ticketing apparatus is utilized it is desirable that some type of apparatus be provided whereby the calling subscriber may be identified in order that correct billing may result.

Accordingly, it is an object of the present invention to provide mechanism for automatically indicating the calling subscriber's number.

A further object of the invention is to provide an audible line identifier for achieving such function.

Still another object of the invention is to provide line identifier mechanism which may be incorporated with standard telephone circuits or systems.

Yet another object of the invention is to provide photographic films bearing visual representations of audible tone frequency designations of calling subscriber's exchange and numbers in combination with photoelectric cells and a set of distributors whose segments are predeterminedly associated with individual subscribers so as to render effective at one time only the designation of the calling subscriber.

The present invention is hereinafter described as incorporated in a standard panel dial switching system, only sufficient of which is described as is necessary to understand the present invention. It is obvious, however, that the invention is not limited to application with such a system, but may be utilized in other standard telephone switching systems.

The apparatus, in general, includes a plurality of storage recorders for telephonic retransmission of exchange designations and subscriber's numbers in combination with a set of distributors whose segments are predeterminedly associated with individual subscribers in such a manner as to render effective ones only of said recorders which correspond to the exchange designation and integers for identifying the corresponding individual subscribers. The storage recorders consist of photographic films bearing a visual representation of audible tone frequency designations and an associated photocell responsive to such designations.

The features and advantages of the present invention will become apparent from the following detailed description of an embodiment thereof, when read in conjunction with the accompanying drawings, in which.

The following description will only refer to so much of the telephone system as is necessary for a complete understanding of the invention, as such system is of the standard panel dial type, which is well known to those versed in the art.

Figure 1:
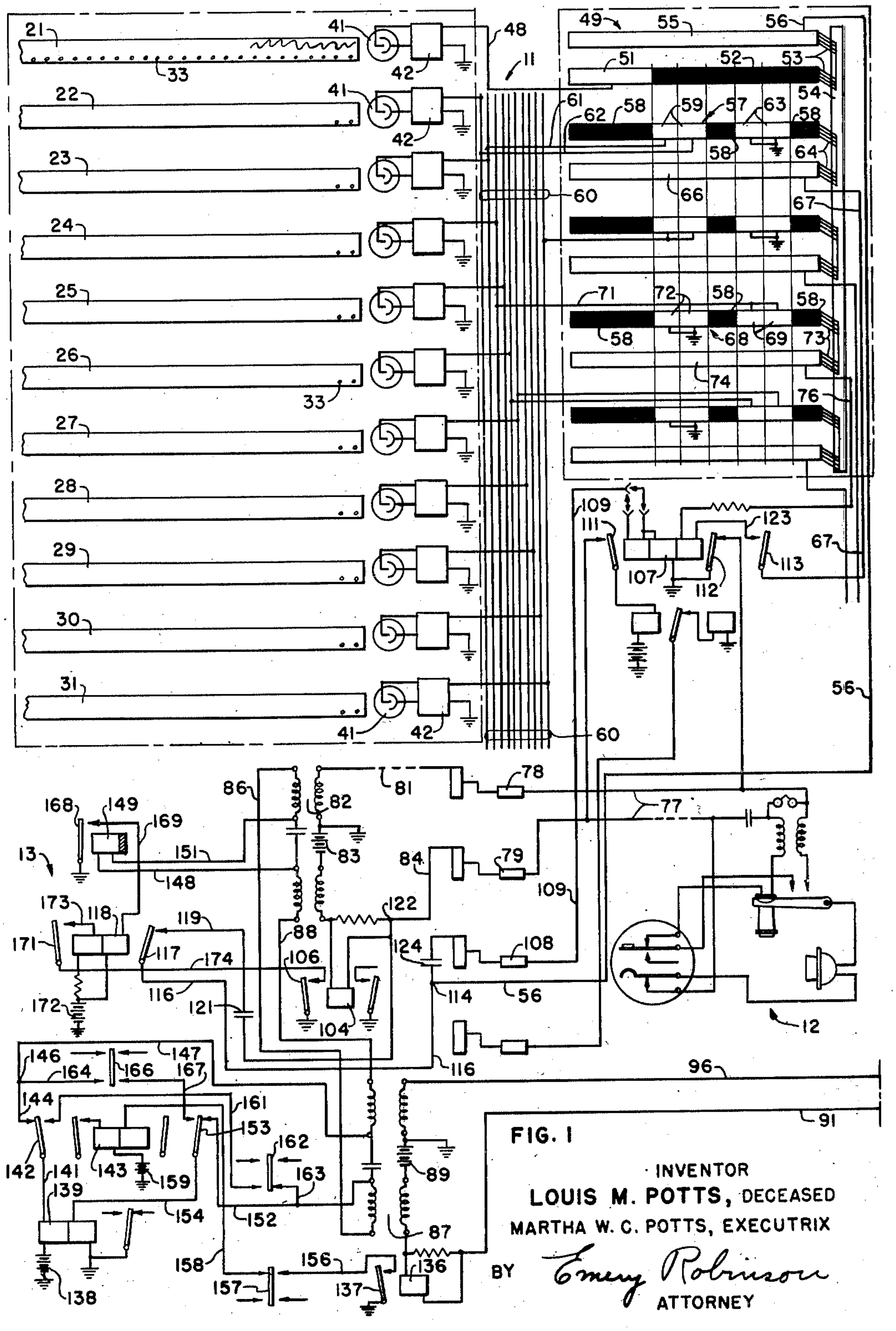
Figs. 1 and 2 illustrate a telephone system incorporating therein line identifying mechanism and circuits, and should be viewed together from left to right.
Figures 2, 3, 4:
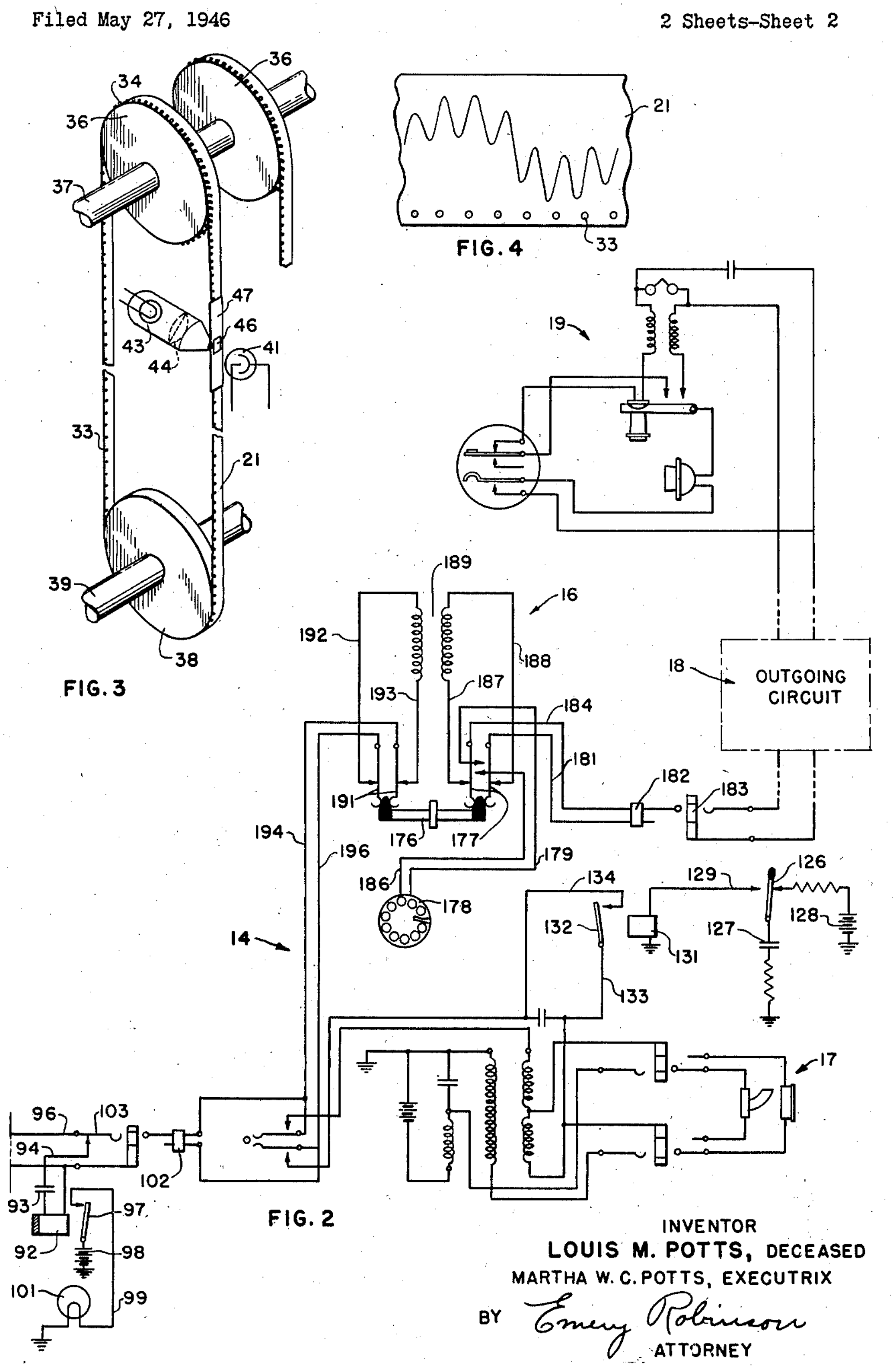
Fig. 3 is an enlarged detail view of part of the line identifying mechanism.
Fig. 4 is an enlarged portion of a section of film used with the line identifier.

Referring now to Figs. 1 and 2 the line identifier apparatus 11 is shown in conjunction with a panel dial telephone system which includes a calling subscriber's station indicated generally by the numeral 12, line finder district and incoming circuits indicated generally by the numeral 13 which extend a circuit to an operator's circuit indicated generally as 14 (Fig. 2) and which includes an operator's cord circuit indicated generally as 16 and an operator's head set indicated generally as 17. The circuit may further be traced from the operator's circuit 16 over an outgoing circuit indicated generally as 18 to a called subscriber's station indicated generally as 19.

The above telephone equipment operates in a standard manner as is well known in the art and results in the operator responding to the dialing of an operator's call signal by a calling subscriber, the operator learning the identity of the calling and called subscriber and thereafter extending the call through the necessary switching equipment to the desired called subscriber.

The specific line identifier mechanism utilized with the above circuits will first be described generally and thereafter in conjunction with the telephone circuits.

With reference to Fig. 1 particularly, the line identifier 11 comprises a plurality of films 21 to 31, inclusive. The film 21 is divided into portions of three sections on each portion of which is provided in audible tone frequency designations the three symbols indicative of a particular exchange, such, for example, as the call letters BUC in the exchange Buckingham. Fig. 4 is an enlarged view of a portion of the film 21 and shows thereon a portion of the audible tone frequency designation for the letter "B."

Each of the films 22 to 31 inclusive has the integers 0 and 1 to 9, inclusive, photographed thereon in audible tone frequency designations, as for example, the film 22 may have the integer 0 photographed thereon reoccurring many times, the film 23, the integer 1, and so on to the integer 9 on film 31.

Such film, as 21 for instance, may be seen more clearly in Fig. 3 wherein it is to be noted the film is provided with feed holes 33 which cooperate with feed pins 34 provided on the periphery of a feed sprocket 36 secured to a shaft 37 which is driven continuously by any suitable means, not shown. The shaft 37 is provided with a plurality of feed sprockets such as 36 which cooperate individually with each of the films 21 to 31, inclusive.

The film 21 is in the form of a continuous loop and passes over an idler roller 38 which is loosely mounted on a shaft 39 and which serves to keep the film 21 relatively taut. As was true with respect to the feed sprockets 36, there are a plurality of idler rolls 38 on the shaft 39 each of which is associated with one of the films 21 to 31, inclusive.

Referring again to Fig. 1, it may be seen that a photocell 41 is provided adjacent to each of the films which is connected in circuit with a suitable amplifier 42, associated with the particular photocell. As may be seen in Fig. 3, a light source 43 is provided which through a suitable converging lens 44 directs the light to an opening 46 in a guideway 47 through which the film passes. The photocell 41 is provided on the opposite side of the film from the light source 43 and lens 44 and thus as the film passes the opening 46, the photocell 41 is activated in accordance with the audible tone frequency designations on the particular film.

Referring again to Fig. 1, it may be seen that the photocell 41 and amplifier 42 associated with the film 21 is connected by means of a conductor 48 to a distributor ring 49 which is provided with a conducting section 51 forming approximately one-third of the length thereof and an insulated section 52 occupying approximately two-thirds of the ring 49. The ring 49 is connected electrically by a pair of brushes 53 of a common brush arm 54 to a solid ring 55 which has a conductor 56 extending therefrom.

The photocells 41 and amplifiers 42 associated with the integer films 22 to 31, inclusive, are connected to a plurality of common conductors 60 which in turn are connected to distributors similar to that described above. The common conductors 60 are ten in number, one of such conductors being connected with the photocell 41 and amplifier 42 associated with the zero integer film 22, and so forth, the last conductor 60 being connected to the photocell 41 and amplifier 42 associated with the film 31 which bears audible tone frequency designations thereon of the integer 9.

As a specific example, it may be seen that segmented ring 57 has insulated portions 58 and small uninsulated segments 59 the latter of which are connected to the common conductors 60 designating the integers 1 and 0 by the conductors 61 and 62, respectively. The distributor ring 57 is also provided with small segments 63 which are grounded over an obvious circuit. The distributor ring 57 is connected electrically by means of a pair of brushes 64 of the common brush holder 54 to a solid ring 66 from which extends a conductor 67.

In the specific instant example attention is also directed to a segmented distributor ring 68 which has similar insulated sections 58 as has the ring 57 and which has two small segments 69 connected to the common conductor 60 indicative of the integer 2 by means of a conductor 71. In this case the small segments 69 are in aligned position with the grounded segments 63 of the ring 57. The ring 68 is provided with two grounded segments 72 which are in a position of alignment with the segments 59 of the ring 57, previously described as being connected to the common conductors 60 indicative of the integers 1 and 0. The ring 68 is connected electrically by a pair of brushes 73 on the common brush holder 54 to a solid ring 74 which has a conductor 76 extending therefrom.

It should be noted that in the above example only two pairs of integer distributor rings have been described whereas four have been illustrated in Fig. 1. In the present invention it is proposed to provide one hundred sets of distributor rings such as 57 and 66, and the undescribed pair immediately therebelow, in order that in the rotation of the common brush arm or arms 54, signals may be generated indicative of all possible combinations of the thousands and hundreds integers of a telephone number from 00 to 99 inclusive. Likewise, it is proposed to provide one hundred sets of rings similar to rings 68 and 74, and the undescribed pair immediately therebelow, in order that designations indicative of all possible combinations of tens and units integers that may occur in a telephone number from 00 to 99 may be generated.

It should also be noted that the various distributors are predeterminedly wired to individual subscribers, one each of the thousands, hundreds and tens units distributors being joined. In this manner a complete four digit number will always be transmitted, and because of the predetermined wiring the same number will always be transmitted for the same calling subscriber.

Under the above described illustration it is to be remembered that the integers 1, 0 were described as the thousands, hundreds integers and 2, 2 were described as the tens and units integers, along with the previous description of the exchange designation as BUC. Accordingly, in the present example it is proposed that the designation of the calling station 12 be BUC 1022, as described above and as will be mentioned hereinafter.

Thus, with the inclusion of one hundred thousands, hundreds integer distributors and one hundred tens, units integer distributors and a single exchange designation it is possible to provide numbers indicative of calling stations to the extent of any combinations of four digit numbers in a particular exchange. It is obvious, however, that by providing a different type distributor and a greater number thereof it is possible to extend such use to telephone numbers having a number of digits greater than four.

As a further example, by tracing the connections from the common conductors 56 to the two sets or pairs of distributors not described in detail, it may be seen that they would be connected to a calling subscriber having the telephone designation BUC 9945.

It is now deemed advisable to describe more in detail the telephone circuit in conjunction with which the line identifier is utilized and thereafter provide a description of the combined apparatus from an operational standpoint.

In the following description let it be assumed that the calling subscriber 12 has dialed his apparatus with the code or codes indicative of the operator which will result in the line finder district and incoming circuits 13 operating to complete an electrical circuit over the conductors 77 extending from the calling subscriber 12 to the tip 78 and ring 79 connections in the line finder district. Thereafter the circuit may be extended from the tip connection 78 over a conductor 81, through the upper right-hand winding of a repeating coil 82 to ground, and thence over battery 83, through the lower right-hand winding of the repeating coil 82 and through a resistor and over a conductor 84 to the ring connection 79.

Further tracing of the circuit through the line finder district and incoming circuits 13 may be from the upper left-hand winding of the repeating coil 82, over a conductor 86, through the lower left-hand winding of a repeating coil 87, through a condenser and the upper left-hand winding of the repeating coil 87 and over a conductor 88 to the lower left-hand winding of the repeater coil 82.

Further tracing of the circuit from the line finder district and incoming circuit 13 may be had from battery 89, through the lower right-hand winding of the repeating coil 87, over a conductor 91, through the winding of an alternating current relay 92, through a condenser 93, over conductors 94 and 96, and through the upper right-hand winding of the repeating coil 87 to ground. Such circuit is thus extended to the operator's cord circuit or position 14 wherein the resulting energization of the alternating current relay 92 will result in the attraction of its armature 97 completing a circuit from grounded battery 98, through the armature 97, over a conductor 99 and through the filament of a light bulb 101 to ground. The light bulb 101 will immediately become illuminated indicating to the operator that a calling subscriber desires telephonic interconnection.

Upon the operator noting the illumination of the bulb 101, the plug 102 will be inserted in the associated jack 103 resulting in the opening of the connection between conductors 94 and 96, thereby causing the alternating current relay 92 to become de-energized and the bulb 101 to be extinguished. Upon the connection of the jack and plug the circuit from calling subscriber 12 is extended to the operator's cord circuit 14 and more particularly to the talking circuit 17 in a conventional manner.

At the time that the above circuit is extended from the calling subscriber 12 to the operator's talking circuit 17, a relay 104 (Fig. 1) connected across the conductor 84 will be energized resulting in its attracting associated armatures, one of which is designated as 106. However, the attraction of the armature 106 will have no effect at this time but will be effective at a future time, as will be described hereinafter.

Prior to the connection with the operator and the dialing of the operator's number, but after the calling subscriber 12 removes his receiver, the two left-hand windings of a cut-off relay 107 connected to the sleeve connector 108 over a conductor 109 become energized resulting in the attraction of three armatures 111, 112, and 113. The relay 107 has also been provided with an added third or right winding.

Upon the completion of the circuit from the calling subscriber 12 to the operator's head set circuit 17, as described, audible tone signals from the line identifier 11 will be impressed over that circuit in order that the operator may be apprised as to the station designation of the calling subscriber 12, namely BUC 1022 in the instant example.

It should be noted that the various films, photocells 41, amplifiers 42, and distributors operate continuously to impress audible tone signals on their associated conductors. However, such signals will only be impressed on the telephone circuit when a calling subscriber initiates a call through the operator as the two left-hand windings of the cut-off relay 107 will not be energized until this time. Such audible tone signals will then continue on the circuit, repeated continuously, unless the calling subscriber abandons the call (relay 107 de-energizes) or the operator causes the operation of certain apparatus, as will be described hereinafter.

In the following description let it be assumed that the operator's talking circuit 17 is connected in the circuit at a time when the distributor brushes 53 commence to traverse the uninsulated segment 51 of the segmented distributor ring 49. It should be noted that the film 21 and the brushes 53 operate in such a timed relation that the three portions of the film 21 comprising the exchange designation BUC will pass the opening 46 in the guide 47 and cause a corresponding activation of the photocell 41 during the time that the brushes 53 pass over the uninsulated segment 51. Now, assuming that at the time of the connection the brushes 53 start to transverse the uninsulated segment 51 the photocell 41 and amplifier 42 will operate to impress audible tone signals on the conductor 43 to the uninsulated segment 51, which are then impressed by means of brushes 53, solid ring 55 and conductor 56 to junction point 114, thence over a conductor 116, through the unattracted armature 117 of a relay 118, over a conductor 119 with which it is in engagement, through a condenser 121 to junction point 122 of the conductor 84, previously described. In this manner audible tone signals indicative of the station designation BUC will be impressed to the repeating coil 82, and thence over the previously described circuit to the operator's talking circuit 17.

During the time that the brushes 53 are traversing the uninsulated portion 51 the brushes associated with the various other distributor rings provided for the thousands, hundreds integers and tens and units integers will be traversing their respective rings but will be passing over the large insulated portion 58 thereof and thus no integer designations will result.

As the brushes 53 pass to the insulated section 52 of the distributor ring 49 the brushes 64 will pass from the large insulated portion 58 of the distributor ring 57 to the first of the two small segments 59 connected by conductors 61 and 62 respectively to two of the common conductors 60. As the brushes 64 traverse the two short segments 59 in succession audible tones indicative of the integers 1 and 0 will be impressed from the second and first common conductors 60, respectively, over the conductors 61 and 62 to the two small segments 59, thence over the brushes 64 to the solid ring 66, over the conductor 67, through the armature 113 which is now held in its attracted or left-hand position due to the energization of the two left windings of the relay 107, over a conductor 123, through the added or right-hand winding of the cut-off relay 107, through a resistor and over the conductor 76 to the solid distributor ring 74, over the brushes 73, which are traversing the short segments 72 at the same time as the brushes 64 traverse the short segments 59, to ground. Thus, audible tone signals are impressed in the right-hand winding of the three winding relay 107 indicative of the integers 1, 0.

It should be noted that during the time that the operation described above is occurring; that is, with the distributor brushes traversing the first two short segments of their respective segmented distributor rings, the only audible tones which can possibly be transmitted over the described circuits are those of the integers 1, 0, because only one pair of thousands, hundreds distributor rings such as 59 and 66 will be so connected to the calling subscriber's circuit and all of the pairs of distributor rings associated with the tens, units integers will have their two first short segments grounded rather than being connected to any of the common conductors 60.

The audible tone signals were just traced as passing through the right-hand winding of the relay 107, which will energize in accordance therewith and will superimpose corresponding tone frequencies to the two left-hand windings thereof resulting in a circuit which may be traced from the left-hand windings of the relay 107, over the conductor 109 to the sleeve connection 108, and thence through a condenser 124, over the conductor 116, through the armature 117 (still in its unattracted position), over the conductor 119 in engagement therewith, through the condenser 121 to junction point 122, and thence through the unnumbered resistor to the repeater coil 82. Thus, at this time the audible tone signals indicative of the integers 1, 0 will be impressed over the previously described circuits to the operator's talking circuit 17 to apprise her of the thousands and hundreds integers in the calling subscriber's number.

The condenser 124 has been provided in order that the exchange designation, previously described as being impressed on the conductor 56 to the junction point 114 with the conductor 116, may not cause a backup circuit to the sleeve connection 108.

After the brushes 64 have traversed the two short segments 59 causing the described audible tones to be impressed on the circuit they will traverse the short insulated segment 58 which is provided on all of the segmented integer distributor rings. Such has been provided inasmuch as the brushes are traversing the distributors at a rate one-third of that that the films 21 to 31, inclusive, are passing the opening 46 and activating their corresponding associated photocells 41, and therefore for timing purposes and to insure the proper tone generation, short insulated segment 58 has been provided after the thousands and hundreds integers have been impressed on the circuit. As the various brushes traverse the short insulated segment 58 no signals will be impressed on any of the circuits.

As the brushes 64 further traverse the segmented ring 57 they will pass over the two short grounded segments 63. However, inasmuch as these segments are not connected to any of the common conductors 60 it is obvious that no audible tone signals will result from the cooperation therewith by the brushes 64.

However, as the brushes 73 associated with the segmented distributor ring 68, which are correspondingly timed with the brushes 64, pass over the two short segments 69 audible tone signals will be impressed over previously described circuits which may be traced from the third common conductor 60 indicative of the integer 2, over the conductor 71, through the two short segments 69, over the brushes 73 to the solid ring 74, over the conductor 76, through a resistor, through the added or right-hand winding of the cutoff relay 107, over the conductor 123, through the armature 113 now in its attracted position, over the conductor 67 to the solid ring 66, through the brushes 64 which as described are at this time traversing the short segments 63, to ground. Thus, during this interval the right-hand winding of the cutoff relay 107 will be operated in accordance with audible tone frequency designations for integers of the tens and unit positions which in the present example have been described as being the integers 2, 2.

At this time the alternating current in the right-hand winding of the relay 107 will be induced in the two left-hand windings thereof, and will be superimposed on the normal direct current resulting in audible tone signals being impressed over the previously described circuits; that is, over conductor 109 to sleeve connection 108, through the condenser 124, over the conductor 116, through the armature 117 in its unattracted position, over the conductor 119, through the condenser 121 to junction point 122, through a resistor and the right-hand windings of the repeater coil 82 and thence over the described circuits to the operator's talking circuit 17.

Thus, the operator will now receive audible tone signals indicative of the tens and units integers of the calling subscriber's number. Inasmuch as, previously described, the operator already has received the exchange designation and the thousands and hundreds integers the operator now knows the entire designation of the calling subscriber 12 and may enter it on the toll ticket provided therefor.

Similarly as was described above, during the impression of the tens and units integers no other integers may be impressed on the circuits because there is but a single distributor pair connected for a 2, 2 designation in the tens and units position and the brushes associated with the thousands and hundreds integer distributors are passing over grounded segments at such time.

If no further operations were to occur at this time the audible tone signals would be continuously generated and impressed to the operator's talking circuit 17 in a manner as has just been described, until such time as the calling subscriber decided to abandon the call or replace the receiver on the hook. However, the operator is provided with special apparatus as will now be described. As may be seen in Fig. 2 the operator is provided with a special key or push button 126, which is normally in its right-hand position resulting in the completion of the circuit from ground, through the resistor and the condenser 127, through the key 126 and through a resistor to grounded battery 128. During the establishment of the above circuit with the key 126 in its normal position the condenser 127 will be charged from the battery 128. After the operator has received the calling subscriber's station designation and indicated it on the toll ticket the operator will cause the key or push button 126 to be moved toward the left resulting in the establishment of a circuit from ground, through the resistor and condenser 127, through the key 126, over a conductor 129, and through the winding of a relay 131 to ground. As soon as the key is moved to its left-hand position the condenser 127 will discharge through the winding of the relay 131 resulting in this relay being energized momentarily, or until the condenser 127 discharges completely.

During the momentary energization of the relay 131 its armature 132 will be attracted thereto resulting in the completion of a circuit from conductor 133, through the armature 132 to the conductor 134, which results in a current surge being generated in the talking circuit 17 which is transmitted through the plug 102 and jack 103 to the conductors 91 and 96 causing a relay 136, Fig. 1, to be energized, resulting in its armature 137 being attracted thereto.

During the normal operation of the telephone circuits a circuit is established which may be traced from grounded battery 138, through the left-hand winding of a relay 139, over a conductor 141, through the unattracted armature 142 of a relay 143 having two windings, over a conductor 144 to junction point 146, over a conductor 147, through the upper left-hand winding of the repeater coil 87, over the conductor 88 and through the lower left-hand winding of the repeater coil 82, over a conductor 148, through the winding of a polarized relay 149, over a conductor 151, through the upper left-hand winding of the repeater coil 82, over the conductor 86, through the lower left-hand winding of the repeater coil 87, over a conductor 152, through an unattracted armature 153 of the relay 143, over a conductor 154 and through the right-hand winding of the double winding relay 139 to ground. This is the normal condition for the polarized relay 149, as is well known in the telephone art, and which is utilized as a register relay. Under the above condition nothing will occur in the telephone circuit.

Remembering now that the relay 136 was indicated as having become energized and the armature 137 attracted thereto, a circuit will be established which may be traced from ground, through the armature 137, over a conductor 156, through a sequence switch 157 which will now be in its closed position, over a conductor 158, through the right-hand winding of the double wound relay 143 to grounded battery 159. The relay 143 will thus become energized causing its armatures 142 and 153 to be attracted thereto.

As a result of the attraction of the armature 142 a circuit will be established which may be traced from grounded battery 138, through the left-hand winding of relay 139, over conductor 141, through the armature 142, over a conductor 161, through a sequence switch 162 which is now in its closed condition, over conductors 163 and 152, through the lower left-hand winding of the repeater coil 87, over the conductor 86 to the upper left-hand winding of the repeater coil 82, over the conductor 151, through the winding of the polarized relay 149, over the conductor 148 and through the lower left-hand winding of the repeater coil 82, over the conductor 88, through the upper left-hand winding of the repeater coil 87, over the conductor 147 to junction point 146, over a conductor 164 and through the selector switch 166 which is in its closed condition, over a conductor 167, through the armature 153 which is now in its attracted or left-hand position, over the conductor 154 and through the right-hand winding of the relay 139 to ground. Such reversal of current in the winding of the polarized relay 149 results in that relay becoming energized and attracting its armature 168 thereto. It might be noted that the condensers are inserted between the upper and lower left-hand windings of the repeater coils 82 and 87 in order that the current just described may not pass from one of the repeater coils to the other. The initially described circuit for polarized relay 149 is broken at armatures 142 and 153 as they are attracted.

As a result of the energization of the polarized relay 149, which in the instant case will be for a very short time in duration and during which time the register which it normally operates will be suppressed from operation, an electrical circuit is established which may be traced from ground, through the armature 168, over a conductor 169, and through the right-hand winding of the relay 118 to grounded battery, which is not illustrated but which is provided in a manner well known in the telephone art. The relay 118 is extremely fast and as a result of the energization of the right-hand winding thereof will cause the attraction of the associated armature 171 which results in the establishment of a locking electrical circuit which may be traced from grounded battery 172, through a resistor and the left-hand winding of the relay 118, over a conductor 173, through the armature 171 now in its attracted position, over a conductor 174, and through the armature 106 which is in its attracted or right-hand position due to the energization of the relay 104 to ground. Such circuit supplies locking current for the relay 118, holding it in its energized condition with its armature 117 attracted thereto or toward the left, until such time as will be described hereinafter.

As a result of the energization of the relay 118 and the attraction of the armature 117 thereto, the circuit is broken between the conductors 116 and 119 over the armature 117, which was previously described as forming part of the circuit over which the audible tone signals for both the exchange BUC and the number 1022 were traced. Therefore, under this condition the audible tone signals are no longer impressed over the line finder and incoming circuits 13 to the operator's talking circuit 17 but instead are cut off before they reach the telephone circuit.

After the above has occurred the operator will cause switch or key 176 (Fig. 2) to be moved from its normal or illustrated position to a position whereat the connectors thereof will be removed from engagement with the associated contact swinger members. Under this condition the contact swingers 177 are free to move to their relaxed or inner positions resulting in the establishment of an electrical circuit which may be traced from the telephone dial 178 which is standard equipment, over the conductor 179 to the right-hand swinger 177, and over a conductor 181 to plug member 182 associated with the jack 183. The circuit may be further traced from the opposite side of jack 183, through the plug 182, over a conductor 184, through the left-hand movable swinger 177 and over a conductor 186 to the telephone dial 178. Inasmuch as the jack 183 serves as a connecting link between the outgoing circuits 18 and the called subscriber's station 19 the dial 178 will thus be placed in circuit therewith and the operator may dial the number of the called subscriber in accordance with the request of the calling subscriber. At such time as the called subscriber answers the operator will be aware thereof as is standard telephone practice.

At such time as the called subscriber acknowledges the call the operator replaces the switch or key 176 to its normal or unoperated position at which time the connectors thereof cause the movable swinger pairs such as 177 to be moved to their unrelaxed positions. As a result of such operation the contact swingers 177 will be moved outwardly thereby resulting in the breaking of the circuit which had previously been described from the conductors 179 and 186 through the movable swingers 177 to the conductors 181 and 184, respectively. The dial 178 is thus removed from the circuit.

Upon the movement of the switch or key 176 just described the movable swingers 177 cause conductors 187 and 188 and the right-hand winding of repeater coil 189 to be placed in circuit with the conductors 184 and 181 leading to the plug 182, jack 183, and outgoing circuit 18. Simultaneously therewith the movable swingers 191 will cause the conductors 192 and 193 and the left-hand winding of the repeater coil 189 to be placed in circuit with a pair of conductors 194 and 196 which connect with the jack 102 and plug 103 associated with the line finder and incoming circuits 13. Thus, a talking circuit will be completed which may be traced from the calling subscriber's station 12, through the line finder district and incoming circuits 13, through the operator's cord circuit 176 (particularly the repeater coil 189) and through the outgoing circuits 18 to the called subscriber 19. The telephone conversation may thus progress in the usual manner.

At such time as it is desired to end the call either the called or calling subscriber will replace their receiver upon the hook at their associated station resulting in an immediate breakdown of the interconnecting circuits previously described. One of the first results of the disestablishment of the telephonic connection will be the de-energization of the relay 104 which will result in the armature 106 no longer being attracted thereto and thus the disestablishment of the circuit which had previously been traced through the armature 106 and over the conductor 174 for the locking current for the relay 118. The relay 118 will immediately de-energize which will result in its armature 117 being no longer attracted and moving to its right-hand position, once again completing the circuit between the conductors 116 and 119 in readiness for further operation of the line identifier 11 to the operator's circuit upon the instigation of another call by a calling subscriber (and energization of the relay 107). Thus, the apparatus is now back to its normal or unoperated position in readiness for another cycle of operation.

While the instant apparatus has been described as utilizing films bearing audible tone frequencies indicative of the exchange and number designations, it is obvious that other means may be employed, such as magnetic recordings, etc.

Further, while a single calling subscriber's station has been described it must be kept in mind that the present invention incorporates line identification for a plurality of calling subscriber's stations, as distributors are provided for generating signals for integers in the thousands, hundreds position from 00 to 99 and in the tens, units position similarly. Thus, any combination of a four digit number may be achieved, and various exchange designations may be generated also.

While a specific embodiment of the invention has been illustrated and described it is obvious that the invention is not limited thereto but that such is merely an embodiment incorporating the spirit of the invention.

What is claimed is:

1. In a line identifier, a film and photocell for generating audible tone signals indicative of an exchange designation of a calling subscriber, a distributor for receiving the signals generated, a plurality of films and photocells for generating audible tone signals indicative of the integers 0 and 1 to 9, inclusive, representing the numeral designation of said calling subscriber, a first group of distributors for receiving signals generated in the thousands, hundreds positions of a number, a second group of distributors for receiving signals generated in the tens, units positions of a number, and means for combining the output of said distributor, one of the distributors in said first group of distributors, and one of the distributors in said second group of distributors, whereby a complete subscriber designation will be achieved.

2. In a telephone system, a calling subscriber's station, an operator's station, means for interconnecting said stations, a film and photocell for generating audible tone signals indicative of the exchange designation of said calling subscriber's station, a distributor associated with said film and photocell for receiving the signals generated thereby, a plurality of films and photocells for generating audible tone signals indicative of the numeral designation of said calling subscriber's station, a plurality of distributors associated with said plurality of films and photocells for receiving the signals generated thereby, means for causing the output of said first-mentioned distributor to be impressed directly to said operator's station when said stations are interconnected, a cutoff relay, and an additional winding on said cutoff relay cooperating with said plurality of distributors for superimposing the output of said plurality of distributors on said cutoff relay, whereby the signals indicative of the numeral designation of said calling subscriber's station are impressed from said cutoff relay to said operator's station when said stations are interconnected.

3. In a telephone system, a plurality of calling subscriber's stations, each having assigned thereto an exchange designation and a numeral designation, an operator's station, means for interconnecting each calling subscriber's station with said operator's station, a film and a photocell for generating audible tone signals indicative of the exchange designation of said plurality of calling subscriber's stations, means for receiving the signals generated thereby, a plurality of films and photocells for generating audible tone signals indicative of the numeral designations of said plurality of calling subscriber's stations, means for selecting and receiving only the signals generated thereby indicative of the numeral designation of the calling subcriber's station interconnected with said operator's station, means for impressing the output of said first-mentioned signal receiving means to said operator's station when one of said calling subscriber's stations is interconnected with said operator's station, a cutoff relay, and an additional winding on said cutoff relay for superimposing the output of said last-mentioned signal receiving means on said cutoff relay, whereby the signal indicative of the numeral designation of said calling subscriber's station interconnected with said operator's station are impressed from said cutoff relay to said operator's station when one of said calling subscriber's stations is interconnected with said operator's station.

4. In a line identifier for use in telephone circuits, a plurality of films and photocells for generating audible tone signals indicative of a calling subscriber's station, a distributor for receiving audible tone signals from one of said photocells indicative of the exchange designation, a plurality of distributors associated with predetermined of said films and photocells for receiving audible tone signals indicative of the subscriber's number, means for impressing said audible tone signals indicative of said exchange designation directly to the telephone circuit from said first-mentioned distributor, a cutoff relay, means for impressing said audible tone signals indicative of said subscriber's number on said cutoff relay from said plurality of distributors, and means for impressing said audible tone signals indicative of said subscriber's number from said cutoff relay to the telephone circuit.

MARTHA W. C. POTTS,

*Executrix Under the Last Will and Testament of Louis M. Potts, Deceased.*

REFERENCES CITED

The following references are of record in the file of this patent:

UNITED STATES PATENTS

| Number | Name | Date |
|---|---|---|
| 1,645,573 | Bascom | Oct. 18, 1927 |
| 1,846,262 | Kittredge | Feb. 23, 1932 |
| 2,318,267 | Taylor | May 4, 1943 |